United States Patent
Bauer et al.

(10) Patent No.: US 9,395,701 B2
(45) Date of Patent: Jul. 19, 2016

(54) ACTIVE DEAD BAND FOR NOISE REDUCTION IN HIGH RESPONSE HIGH BANDWIDTH CONTROL SYSTEMS

(71) Applicant: Hamilton Sundstrand Corporation, Windsor Locks, CT (US)

(72) Inventors: Ronald P. Bauer, Windsor Locks, CT (US); Jason B. Solomonides, Cromwell, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 4 days.

(21) Appl. No.: 14/491,221

(22) Filed: Sep. 19, 2014

(65) Prior Publication Data

US 2016/0085217 A1 Mar. 24, 2016

(51) Int. Cl.
*G05B 5/01* (2006.01)
*G05B 6/02* (2006.01)

(52) U.S. Cl.
CPC ... *G05B 5/01* (2013.01); *G05B 6/02* (2013.01)

(58) Field of Classification Search
CPC ..................................................... G05B 13/00
USPC ......... 318/560, 561, 590, 596, 624, 629, 635, 318/568.18, 400.14, 400.15, 700, 701, 727, 318/400.01, 721, 799, 800, 437; 388/800
See application file for complete search history.

(56) References Cited

U.S. PATENT DOCUMENTS

| | | | | |
|---|---|---|---|---|
| 3,961,234 A | * | 6/1976 | Chambers | G05B 5/01 318/561 |
| 5,062,404 A | * | 11/1991 | Scotson | F02D 11/105 123/399 |
| 6,639,375 B2 | * | 10/2003 | Paris | G05B 13/021 318/561 |
| 8,072,851 B2 | * | 12/2011 | Yamanaka | G02B 7/08 348/347 |
| 2003/0080707 A1 | * | 5/2003 | Paris | G05B 13/021 318/560 |
| 2015/0291302 A1 | * | 10/2015 | McNestry | B65C 9/1865 156/64 |

* cited by examiner

*Primary Examiner* — Antony M Paul
(74) *Attorney, Agent, or Firm* — Cantor Colburn LLP

(57) ABSTRACT

A control system comprises an active dead band, coupled to a feedback path of the control system, configured to receive a first signal derived from a motor position signal of the feedback path of the control system and a utilize, in accordance with the signal, a set of thresholds to prevent feedback noise within a driveline of the control system.

12 Claims, 3 Drawing Sheets

ACTIVE DEAD BAND FOR NOISE REDUCTION IN HIGH RESPONSE HIGH BANDWIDTH CONTROL SYSTEMS

BACKGROUND

The disclosure relates generally to noise and disturbance reduction in a control system, and more specifically, to an active dead band incorporated into a high response high bandwidth control system to squelch feedback noise and block unwanted disturbances.

In general, a control system typically suffers from noise and disturbances. For instance, the noise and disturbances are generated and/or picked up as electrical noise by feedback sensors, electronic circuitry, and/or estimator algorithms of the control system. This electrical noise is then injected into control loops as feedback noise. The feedback noise is then exacerbated by high loop gains of the control system and, thus, ripples through the control system. Further, the feedback noise manifests as audible noise, high frequency limit cycles, and/or vibrations that lead to high life-cycle fatigue or premature failure of the control system. To combat the noise, a typical control system employs filter, signal averaging, and/or dynamic compensation network techniques. Yet, these techniques restrict bandwidth, which results in a sluggish time response of the system under control.

SUMMARY

According to one embodiment of the present invention, a control system comprises an active dead band, coupled to a feedback path of the control system, configured to receive a first signal derived from a motor position signal of the feedback path of the control system and a utilize, in accordance with the signal, a set of thresholds to prevent feedback noise within a driveline of the control system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, feedback noise leads to high life-cycle fatigue or premature failure of a control system, while current techniques for feedback noise reduction results in a sluggish time response of the system. Thus, what is needed for a high response high bandwidth control system is an active dead band incorporated into the controller to squelch feedback noise and block unwanted disturbances.

In general, embodiments disclosed herein may include an active dead band incorporated into a control system. A control system (e.g., the control system 100 of FIG. 1) is a device, or set of devices, that manages, commands, directs or regulates a behavior of another device/system (e.g., the motor 130 of FIG. 1). Control system examples include, but are not limited to, a motor controlled pump system, a motor driven actuation system, a high response electro-hydraulic system, a direct drive electromechanical system, an electro-hydrostatic based actuation system, etc. A control system may be an open loop control system or a closed loop control systems. In the open loop control systems, an output is generated based on inputs. In the closed loop control systems, the output is taken into consideration via a feedback loop so that corrections are made to the output based on feedback.

An active dead band is a circuit or device that controls a signal domain or band, such that no unwanted action occurs on that band. For example, the active dead band of any control system of the embodiments disclosed herein prevents with a set of thresholds feedback noise within a driveline of that control system. The set of thresholds of the active dead band may be actively adjusted by elements of the control system in accordance with changes of input commands, system operating modes, and/or states within that control system. Further, the active dead band thresholds may be controlled by any form of dynamic compensation or logical event with respect to tuning overall performance of the control system. Thus, as changes occur within the control system, the active dead band can be relaxed or compressed to block noise from entering a control loop and disturbing the control system.

In addition, because a time response of the active dead band is negligible, the active dead band provides a near instantaneous command response that preserves the bandwidth of the control system. Because the active dead band eliminates the feedback noise from the driveline, the control system life and reliability are also increased. That is, feedback noise rejection reduces power consumption levels and improves efficiency of the control system. In turn, lighter and/or less durable materials may be used in any design to reduce an overall size, weight, and cost of the design.

Figure 1:
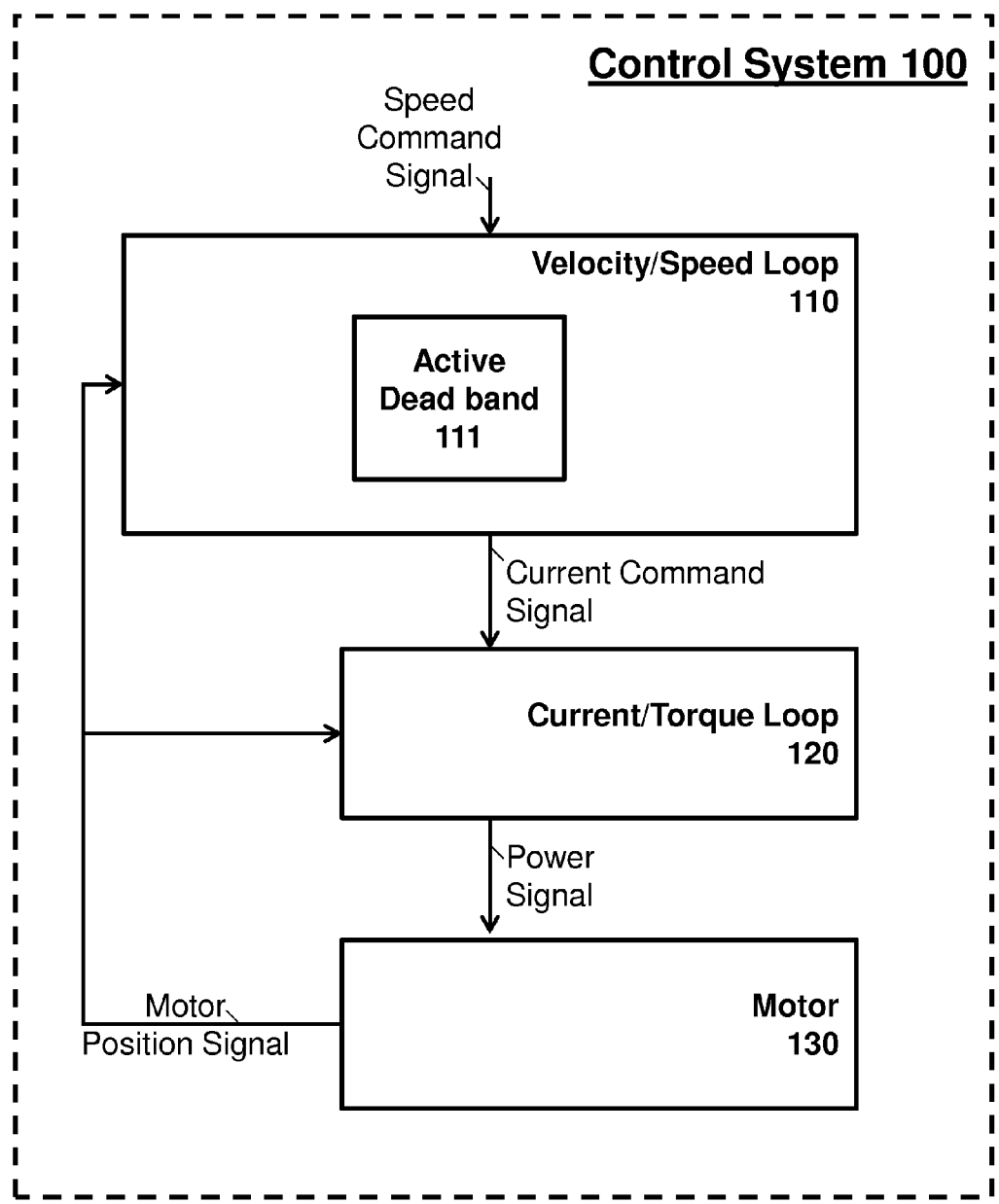
FIG. 1 illustrates a schematic of a control system according to one embodiment.

FIG. 1 illustrates a control system 100, as one embodiment of a control system incorporating an active dead band. The control system 100 comprises a velocity/speed loop 110 that includes an active dead band 111, a current/torque loop 120, and a motor 130.

The control system 100, which is an example of a closed loop control system, manages a driveline through the velocity/speed loop 110 and the current/torque loop 120 to the motor 130.

The velocity/speed loop 110 is a circuit or device that receives and utilizes at least one input (e.g., a speed command signal and a motor position signal) to generate an output (e.g., a current command). For instance, upon receipt of the speed command signal, which is an electrical signal indicating revolutions per minute value, the velocity/speed loop 110 converts the revolutions per minute value into a current value. The velocity/speed loop 110 supplies the current value as the current command to the current/torque loop 120.

The active dead band 111, as described above, is a circuit or device of the velocity/speed loop 110 that prevents feedback noise within the driveline of the control system 100. For example, the active dead band 111 of the control system 100 prevents with a set of thresholds feedback noise within a driveline. The set of thresholds of the active dead band may be actively adjusted by elements of the control system 100 in accordance with changes of input commands, system operating modes, and/or states within that control system (e.g., see dead band 211 of FIG. 2 and/or dead band 311 of FIG. 3).

The current/torque loop 120 is a circuit or device that receives and utilizes at least one input (e.g., the current command and the motor current signal) to generate an output (e.g., the power signal). For instance, upon receipt of the current command, the current/torque loop 120 generates a current in accordance with the current command. The current is then supplied by the current/torque loop 120 to the motor 130, which drives the motor 130 at a speed equivalent to the revolutions per minute value of the speed command signal input into the velocity/speed loop.

A motor (e.g., the motor 130) is a device that creates motion based on an input. Motor examples include, but are not limited to, electric motors, actuators, hydraulic motors, rocket motors, pneumatic motors, etc. The motor 130 may include a rotor position sensor that generates the motor position signal for use by the control system 100.

In operation, the control system 100 processes the speed command signal via the velocity/speed loop 110 to generate a current command. The current command is then supplied to the current/torque loop 120 so that a power signal (e.g., a current) is sent to the motor 130. Further, since the control system 100 is a closed loop control system, the motor current signal is utilized as a feedback input to make corrections to both the speed command and current command signals.

During operation, noise and disturbances are generated and/or picked up as electrical noise by the velocity/speed loop 110, the current/torque loop 120, and the motor 130. This electrical noise is then injected into the driveline via control loops (e.g., error and/or feedback loop of the feedback path of the motor position signal) as feedback noise. Since the control system 100 includes the active dead band 111, as described above, the active dead band 111 is utilized to prevent this feedback noise within the driveline. Two embodiments of the active dead band 111 will now be described.

Figure 2:
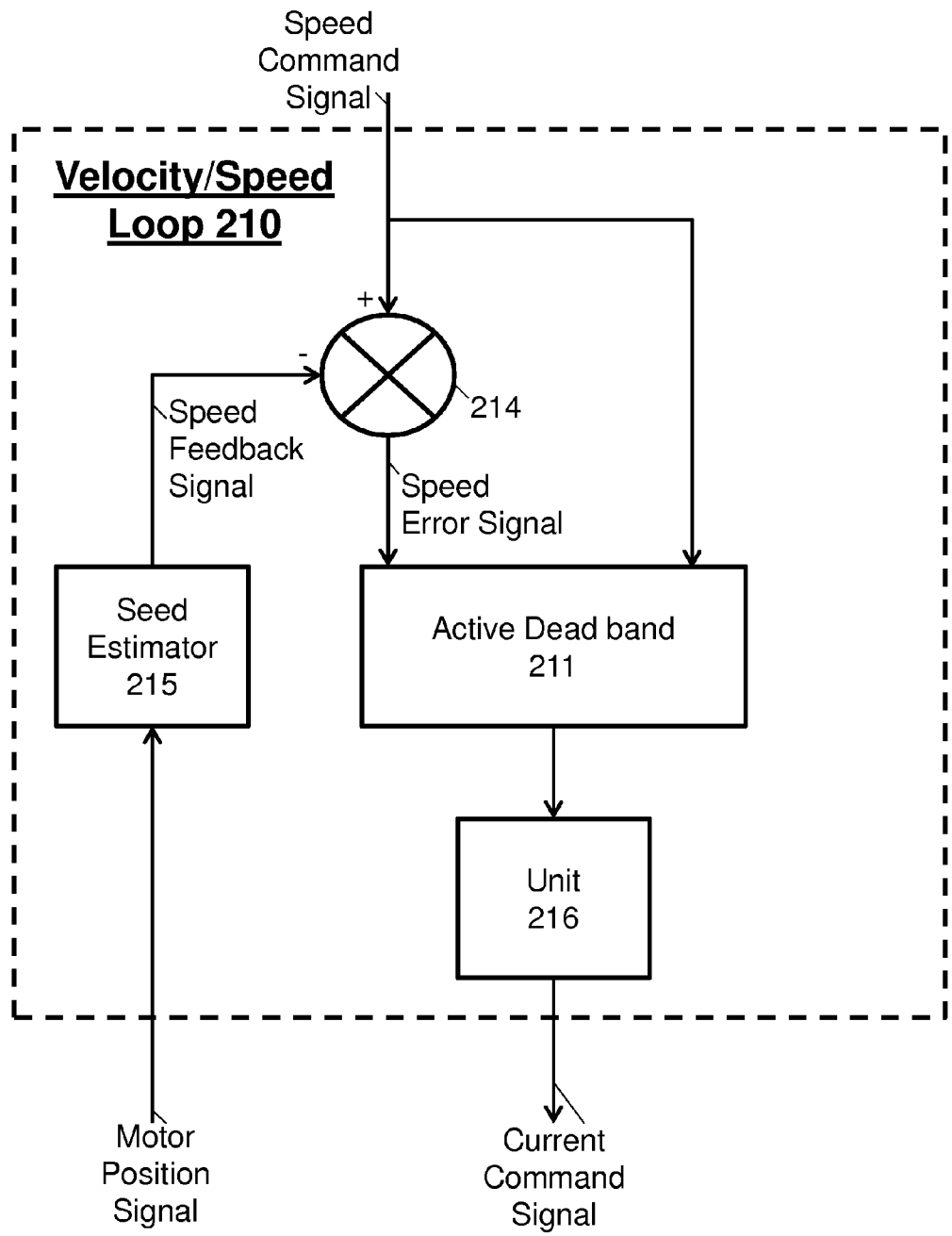
FIG. 2 illustrates a schematic of a velocity/speed loop of a control system according to one embodiment.

FIG. 2 illustrates a velocity/speed loop 200 of a control system according to one embodiment that comprises an active dead band 211, a summer 214, a speed estimator 215, and a unit 216. In FIG. 2, the active dead band 211 directly reduces the feedback noise on a speed error signal (and/or the speed command signal).

The speed error signal is generated by the summer 214. That is, the summer 214 subtracts a speed feedback from the speed command signal to produce the speed error signal.

The speed feedback is the output of the speed estimator 215. That is, the speed estimator 215 computes a derivative of the motor position signal so that the motor position signal is a usable signal by the summer 214.

As indicated above, the motor position signal as it is processed by the summer 214, the speed estimator 215, and other electronic circuitry of the control system, will pick up electrical noise such that the speed error signal will not be a clear signal. Thus, the active dead band is utilized an error portion of the velocity/speed loop 200 and is working on the speed error signal itself. In turn, the active dead band 211 reduces the electrical noise on the speed error signal (and/or the speed command signal) and supplies a clean speed signal to the unit 216. The unit 216 then processes the clean speed signal from the active dead band 211 to produce the current command, which is now error free within the band thresholds.

For example, the velocity/speed loop 210 receives the speed command signal, e.g., a raw velocity error signal, and utilizes the motor position signal to generate the current command. The velocity/speed loop 210 further utilizes the active dead band 211, which is in a feed forward path of the velocity/speed loop 210, to reduce errors on the inputs (e.g., the speed command signal and/or the motor position signal). Errors inside band thresholds (e.g., between thresholds +/− a) of the active dead band 211 are set to zero, while error outside (e.g., greater than) of the band thresholds are passed through with the current command signal.

That is, a loop error signal is set to zero for velocity error inputs that are inside a band (between the thresholds +/− a). The velocity error inputs that are outside the band (greater than the band thresholds) are passed through to the output and feed the current command. The band thresholds are actively adjusted by the speed command signal. Further, a request to move reduces the band thresholds to let error signals pass through the dead band. Noise riding on the error signal during this mode is trivial and is damped out by the large signal to noise ratio.

In addition, when the speed command signal is turned off, the dead band thresholds are raised and small error signals are blocked. Noise from either the velocity command input or riding on the feedback signal is clamped by the active dead band and blocked from disturbing the current loop. Used in this fashion, noise is blocked during standby modes and/or when the motor controlled pump system is at idle.

Figure 3:
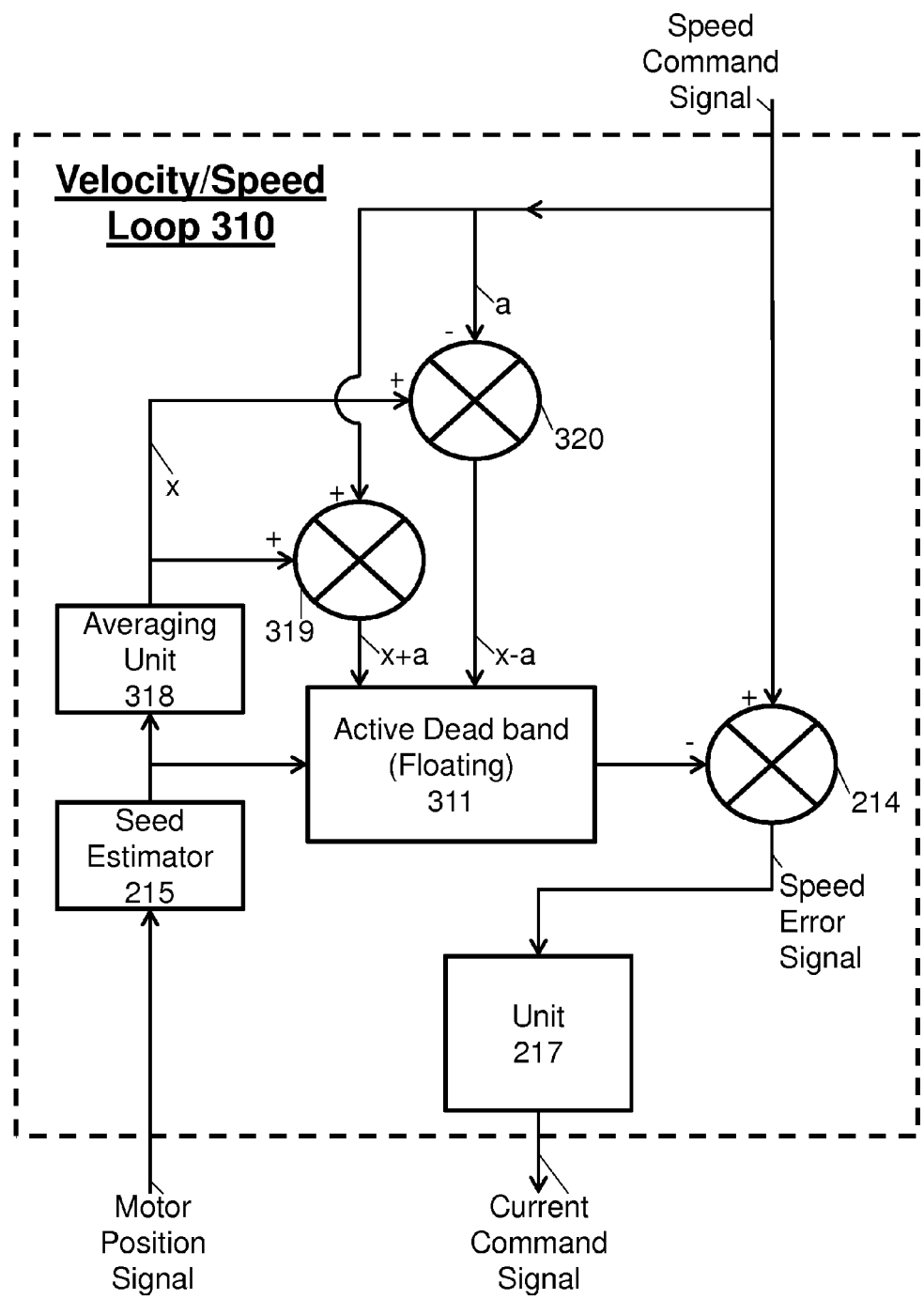
FIG. 3 illustrates a schematic of a velocity/speed loop of a control system according to one embodiment.

FIG. 3 illustrates a schematic of a velocity/speed loop 310 of a control system according to one embodiment that comprises an active dead band 311, an averaging unit 318, a summer 319, and a summer 320. Note that for ease of explanation, previously used elements and identifiers are reproduced in FIG. 3. In FIG. 3, the active dead band 311 directly reduces feedback noise within a feedback loop. For example, the active dead band 311 is placed directly in a feedback path of a velocity loop.

The averaging unit 318 calculates an average speed that is supplied to adders 319, 320. The summer 319, 320 utilize the speed command signal as a reference, such that the active dead band 311 'floats' around the speed command signal. For instance, after the speed estimator 215 computes the derivative of the motor position signal, the averaging unit 318 supplies a signal with a value of 'x' that is added and subtracted with the respective adders 319, 320. The resulting threshold signals (e.g., 'x+a' and 'x−a') are then utilized by the active dead band 311 to filter noise from the derivative of the motor position signal. This filtered derivative is then used by the summer 214 to provide the speed error signal to the unit 217. The unit 217 then outputs the current command signal.

That is, in this embodiment, the active dead band 311 is used to squelch noise produced by the derivative estimator that calculates speed from a rotor position sensor of the control system. The dead band 311 processes the estimated speed input. Speed signals that are inside the band produce an output that is equal to the average speed 'x'. Speed inputs that are larger than the band limits produce an output that is equal to the input (raw estimated speed). This implementation produces a 'floating' dead band that hovers around the average speed or steady state value. Used in this fashion the feed forward path is not restricted by dynamics of the dead band 311 and is more responsive to changes of the speed command signal.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A control system, comprising:
an active dead band, coupled to a feedback path of the control system, configured to:
receive a first signal derived from a motor position signal of the feedback path of the control system; and
utilize, in accordance with the signal, a set of thresholds to prevent feedback noise within a driveline of the control system,
wherein the active dead band is coupled to an error loop of the feedback path, and
wherein the first signal is a speed error signal based on a computation between a speed feedback signal and a speed command signal.

2. The control system of claim 1, wherein the set of thresholds of the active dead band are actively adjusted by elements of the control system in accordance with changes of the control system.

3. A method of preventing feedback noise in a control system, comprising:
coupling an active dead band to a feedback path of the control system;
receiving a first signal derived from a motor position signal of the feedback path of the control system; and
utilizing, in accordance with the signal, a set of thresholds to prevent feedback noise within a driveline of the control system,
wherein the active dead band is coupled to an error loop of the feedback path,
wherein the first signal is a speed error signal based on a computation between a speed feedback signal and a speed command signal.

4. The method of claim 3, wherein the set of thresholds of the active dead band are actively adjusted by elements of the control system in accordance with changes of the control system.

5. A control system, comprising:
an active dead band, coupled to a feedback path of the control system, configured to:
receive a first signal derived from a motor position signal of the feedback path of the control system; and
utilize, in accordance with the signal, a set of thresholds to prevent feedback noise within a driveline of the control system,
wherein the active dead band is coupled to a feedback loop of the feedback path, and
wherein the first signal is a derivative of a motor position signal.

6. The control system of claim 5, wherein the set of thresholds of the active dead band are actively adjusted by elements of the control system in accordance with changes of the control system.

7. A control system, comprising:
an active dead band, coupled to a feedback path of the control system, configured to:
receive a first signal derived from a motor position signal of the feedback path of the control system; and
utilize, in accordance with the signal, a set of thresholds to prevent feedback noise within a driveline of the control system,
wherein the active dead band is coupled to a feedback loop of the feedback path, and
wherein the active dead band is configured to float around a derivative of a motor position signal in accordance with a set of threshold signals based on an average speed computation.

8. The control system of claim 7, wherein the set of thresholds of the active dead band are actively adjusted by elements of the control system in accordance with changes of the control system.

9. A method of preventing feedback noise in a control system, comprising:
coupling an active dead band to a feedback path of the control system;
receiving a first signal derived from a motor position signal of the feedback path of the control system; and
utilizing, in accordance with the signal, a set of thresholds to prevent feedback noise within a driveline of the control system,
wherein the active dead band is coupled to a feedback loop of the feedback path,
wherein the first signal is a derivative of a motor position signal.

10. The method of claim 9, wherein the set of thresholds of the active dead band are actively adjusted by elements of the control system in accordance with changes of the control system.

11. A method of preventing feedback noise in a control system, comprising:
coupling an active dead band to a feedback path of the control system;
receiving a first signal derived from a motor position signal of the feedback path of the control system; and
utilizing, in accordance with the signal, a set of thresholds to prevent feedback noise within a driveline of the control system,
wherein the active dead band is coupled to a feedback loop of the feedback path,
wherein the active dead band is configured to float around a derivative of a motor position signal in accordance with a set of threshold signals based on an average speed computation.

12. The method of claim 11, wherein the set of thresholds of the active dead band are actively adjusted by elements of the control system in accordance with changes of the control system.

* * * * *